(12) United States Patent
Ludwig et al.

(10) Patent No.: US 8,126,187 B2
(45) Date of Patent: Feb. 28, 2012

(54) VEHICLE AUDIO SYSTEM INCLUDING DOOR-MOUNTED COMPONENTS

(75) Inventors: Christopher Ludwig, White Lake, MI (US); Hal P. Greenberger, Natick, MA (US); Timothy Holl, Medway, MA (US)

(73) Assignee: Bose Corporation, Framingham, MA (US)

( * ) Notice: Subject to any disclaimer, the term of this patent is extended or adjusted under 35 U.S.C. 154(b) by 1156 days.

(21) Appl. No.: 11/927,433

(22) Filed: Oct. 29, 2007

(65) Prior Publication Data
US 2009/0110210 A1    Apr. 30, 2009

(51) Int. Cl.
H04R 1/02    (2006.01)
H04R 5/02    (2006.01)
H04B 1/00    (2006.01)
(52) U.S. Cl. ............. 381/389; 381/86; 381/87; 381/302
(58) Field of Classification Search .................... 381/86, 381/87, 302, 389
See application file for complete search history.

(56) References Cited

U.S. PATENT DOCUMENTS

| | | | | |
|---|---|---|---|---|
| 4,039,755 A | | 8/1977 | Berkovitz | 381/27 |
| 4,277,653 A | * | 7/1981 | Pawelzick | 381/395 |
| 4,499,340 A | * | 2/1985 | Kasai et al. | 381/86 |
| 4,594,729 A | | 6/1986 | Weingartner et al. | 381/18 |
| 4,597,470 A | * | 7/1986 | Takagi et al. | 181/141 |
| 4,612,530 A | * | 9/1986 | Kurth et al. | 340/429 |
| 4,641,344 A | | 2/1987 | Kasai | 381/57 |
| 4,728,143 A | * | 3/1988 | Tanino et al. | 296/153 |
| 4,759,066 A | | 7/1988 | Polk | 381/302 |
| 4,866,776 A | | 9/1989 | Kasai et al. | 381/302 |
| 4,903,307 A | | 2/1990 | Ozawa | 381/103 |
| 4,905,860 A | * | 3/1990 | Kurihara et al. | 381/86 |
| 5,023,914 A | | 6/1991 | Arnold | 381/97 |
| 5,111,508 A | | 5/1992 | Gale et al. | 381/100 |
| 5,170,435 A | * | 12/1992 | Rosen et al. | 381/86 |
| 5,200,688 A | | 4/1993 | Patino et al. | 320/104 |
| 5,208,483 A | | 5/1993 | Reneau | 307/10.1 |
| 5,215,346 A | | 6/1993 | Reitzloff | 296/51 |
| 5,680,468 A | | 10/1997 | Van Hout | 381/86 |
| 5,929,769 A | | 7/1999 | Garnault | 340/5.61 |
| 6,119,407 A | * | 9/2000 | Staser et al. | 49/502 |
| 6,226,927 B1 | * | 5/2001 | Bertolini et al. | 49/502 |

(Continued)

FOREIGN PATENT DOCUMENTS

DE    102004002957    8/2005

(Continued)

OTHER PUBLICATIONS

International Preliminary Report on Patentability dated Mar. 4, 2010 for Appl. No. PCT/US2008/070761.

(Continued)

Primary Examiner — Ida M Soward

(57) ABSTRACT

An audio system includes mounting one or more speakers on the surface between an exterior side panel and an interior side panel of a door on a vehicle. The one or more speakers may face substantially along an axis in the longitudinal direction of the door. When the door is open, a cover may be controlled to extend over and close an opening in the interior side panel, thereby allowing sound from the one or more speakers to project to an exterior of the vehicle. When the door is closed, the cover may be controlled to expose the opening, thereby allowing sound from the one or more speakers to enter an interior of the vehicle through the opening.

12 Claims, 5 Drawing Sheets

U.S. PATENT DOCUMENTS

| | | | |
|---|---|---|---|
| 6,324,451 B1 | 11/2001 | Regan | 701/36 |
| 6,389,147 B1 * | 5/2002 | Rush et al. | 381/389 |
| 6,578,658 B2 * | 6/2003 | Jones et al. | 181/141 |
| 6,676,879 B1 * | 1/2004 | Azima | 264/409 |
| 6,731,761 B1 * | 5/2004 | Zablocki et al. | 381/86 |
| 6,977,110 B2 * | 12/2005 | Funakoshi | 428/138 |
| 7,076,071 B2 | 7/2006 | Katz | 381/307 |
| 7,097,229 B1 | 8/2006 | Chernoff | |
| 7,164,773 B2 * | 1/2007 | Fabry | 381/86 |
| 7,177,432 B2 | 2/2007 | Eid et al. | 381/22 |
| 7,239,715 B2 * | 7/2007 | Maekawa et al. | 381/389 |
| 7,313,247 B1 * | 12/2007 | Tilli et al. | 381/389 |
| 7,483,539 B2 * | 1/2009 | Stark et al. | 381/86 |
| 7,913,807 B2 * | 3/2011 | Gomi | 181/150 |
| 7,978,871 B2 * | 7/2011 | Jayasuriya et al. | 381/389 |
| 2001/0026623 A1 * | 10/2001 | Erwin | 381/82 |
| 2002/0136414 A1 | 9/2002 | Jordan et al. | 381/58 |
| 2004/0042624 A1 | 3/2004 | Henderson et al. | 381/86 |
| 2004/0091123 A1 | 5/2004 | Stark | 381/86 |
| 2004/0141625 A1 * | 7/2004 | Leipold | 381/86 |
| 2004/0247141 A1 | 12/2004 | Holmi et al. | 381/86 |
| 2005/0264027 A1 | 12/2005 | Howard | |
| 2007/0080264 A1 | 4/2007 | Kukucka et al. | |
| 2007/0116298 A1 * | 5/2007 | Holmi et al. | 381/86 |

FOREIGN PATENT DOCUMENTS

| | | |
|---|---|---|
| EP | 0348034 | 12/1989 |
| EP | 0729227 | 8/1996 |
| EP | 1137319 | 9/2001 |
| EP | 1487236 | 12/2004 |
| JP | 07304398 A * | 11/1995 |
| JP | 08253082 A * | 10/1996 |
| JP | 2004221688 | 8/2004 |
| JP | 2006-109479 | 4/2006 |
| WO | WO03001885 | 1/2003 |

OTHER PUBLICATIONS

Press release from Infinity Mobile Systems, "Infinity Audio System Featured in Custom Chrysler PT Cruiser at 2002 SEMA Show" Nov. 5, 2002.

EP Examination Report in related Application No. 05108733.6, Oct. 30, 2007.

Official Action in Chinese Application No. 2004100452310, dated Mar. 2, 2007.

European Search Report dated Jul. 6, 2006, issued in related European Application No. 04102444.9.

European Examination Report dated Mar. 7, 2007, issued in related European Application No. 04102444.9.

EP Extended Search Report in Application No. 05108733.6, dated Mar. 2, 2007.

EP Examination Report in related Application No. 04102444.9, dated Mar. 10, 2008.

Action and Response History for U.S. Appl. No. 10/290,989, through Jun. 30, 2008.

Action and Response History for U.S. Appl. No. 11/933,148, through Jun. 30, 2008.

Action and Response History for U.S. Appl. No. 11/933,183, through Jun. 30, 2008.

Action and Response History for U.S. Appl. No. 11/933,172, through Jun. 30, 2008.

Action and Response History for U.S. Appl. No. 11/933,164, through Jun. 30, 2008.

Action and Response History for U.S. Appl. No. 10/457,338, through Jun. 30, 2008.

EP Intent to Grant dated Oct. 15, 2010 for EP Appln. No. 08782190.6.

International Search Report and Written Opinion dated Oct. 7, 2008, issued in International Application No. PCT/US2008/070761, filed Jul. 22, 2008.

* cited by examiner

VEHICLE AUDIO SYSTEM INCLUDING DOOR-MOUNTED COMPONENTS

TECHNICAL FIELD

The disclosure relates generally to an audio system for a vehicle and, more particularly, to door-mounted components of an audio system.

BACKGROUND

Multipurpose vehicles such as sport-utility vehicles and minivans have become increasingly popular, and their users have come to expect more functionality from these versatile means of transportation. Accordingly, the demand for a more functional audio system has increased as well. For example, it is often desirable for a multipurpose vehicle to provide sound (e.g., music) outside the vehicle for events such as tailgating, picnicking, or other similar gatherings.

SUMMARY

Described herein is an audio system for a vehicle that includes one or more speakers mounted in the surface between an exterior side panel and an interior side panel of a door on the vehicle.

The foregoing system may include one or more of the following features. The one or more speakers may include sound-projecting elements that are mounted to project sound rearwards from the door when the door is open and to face substantially along an axis in the longitudinal direction of the door. The interior side panel may include both an opening to acoustically connect the one or more speakers to an interior of the vehicle when the door is closed and a cover that is controllable to expose, or to extend over and close the opening. A control mechanism may control the cover. The control mechanism may be an electro-mechanical or a mechanical system configured to operate in response to opening or closing the door. When the door is open, the cover may be controlled to extend over and close the opening, thereby preventing sound from the one or more speakers to exit the interior panel of the door. When the door is closed, the cover may be controlled to expose the opening, thereby allowing sound from the one or more speakers to enter an interior of the vehicle through the opening.

An input module for receiving data from an audio source may be mounted on an exterior of the vehicle or on the surface to which the one or more speakers are mounted. Each of the one or more speakers may comprise a cone having a front part and a back part. The opening may acoustically connect the back part of the one or more speakers to an interior of the vehicle to enable sound to enter an interior of the vehicle via the opening. The sound that enters the interior of the vehicle may augment sound being produced for the interior of the vehicle by other speakers in the vehicle.

In general, in another aspect, an audio system for a vehicle includes one or more speakers mounted in the surface between an exterior side panel of a door and an interior side panel of the door. The one or more speakers are arranged to direct sound to an exterior of the vehicle when the door is in an open position. Also, the interior side panel includes an opening for enabling sound from the one or more speakers to enter an interior of the vehicle when the door is in a closed position.

The foregoing aspect may include one or more of the following features. The interior panel may include a cover that extends over and closes the opening when the door is in the open position. The interior panel may also include a cover that leaves at least part of the opening exposed when the door is in the closed position. The speakers may be arranged in a line array. Also, when the door is in the open position, speakers in the line array may face substantially along an axis in the longitudinal direction of the door.

In general, in another aspect, an audio system for a vehicle may include a door assembly, where the assembly may include a door, a door frame, one or more speakers, an exterior side panel, an interior side panel, and a seal. The one or more speakers may be mounted in a surface between the exterior side panel and the interior side panel. The seal may be mounted to the perimeter of the door such that it is located between the one or more speakers and an exterior of the vehicle. The one or more speakers may include sound-projecting elements that direct sound to an exterior of the vehicle when the door is open. When the door is closed, sound may enter an interior of the vehicle through a gap between the door and the door frame resulting from an absence of the seal along the door frame.

The foregoing aspect may include one or more of the following features. The one or more speakers may be mounted in the door such that the one or more speakers face substantially along an axis in the longitudinal direction of the door. The seal may comprise an elastomer. The sound that enters the interior of the vehicle may augment sound being produced for the interior of the vehicle. The speakers may be arranged in a line array. The speakers in the line array face substantially toward a rear of the vehicle. An input module for receiving data from an audio source may be mounted on an exterior of the vehicle or on the surface in which the speakers are mounted.

In general, in another aspect, a door-mounted audio system for a vehicle includes one or more speakers mounted in the surface between an exterior side panel and an interior side panel of a door. The one or more speakers are configured to project sound to an exterior of the vehicle when the door is in an open position. When the door is in a closed position, a gap at an interior of the vehicle between the door and the vehicle allows sound from the one or more speakers to enter the interior of the vehicle.

The foregoing aspect may include one or more of the following features. The door may be slidably mounted to the vehicle. The speakers may be in a line array. When the door is in the open position, sound-projecting elements of the speakers in the line array face substantially along an axis in the longitudinal direction of the door. A seal may be disposed around an edge of the exterior side panel. The seal may comprise an elastomer.

In general, in another aspect, an audio system for a vehicle includes at least one transducer mounted in a door of the vehicle. The at least one transducer may include a radiating surface on both a first side and a second side. The at least one transducer is operable in at least two operating modes in which sound is projected to an interior of the vehicle in the first operating mode, and in which sound is projected to an exterior of the vehicle in the second operating mode. In the first operating mode, sound projected to the interior of the vehicle is primarily radiated from the second side of the at least one transducer, and in the second mode, sound projected to the exterior of the vehicle is radiated primarily from the first side of the at least one transducer.

The details of one or more aspects are set forth in the accompanying drawings and the description below. Other

DESCRIPTION OF DRAWINGS

Like reference symbols in the various drawings indicate like elements.

DETAILED DESCRIPTION

Figure 1:
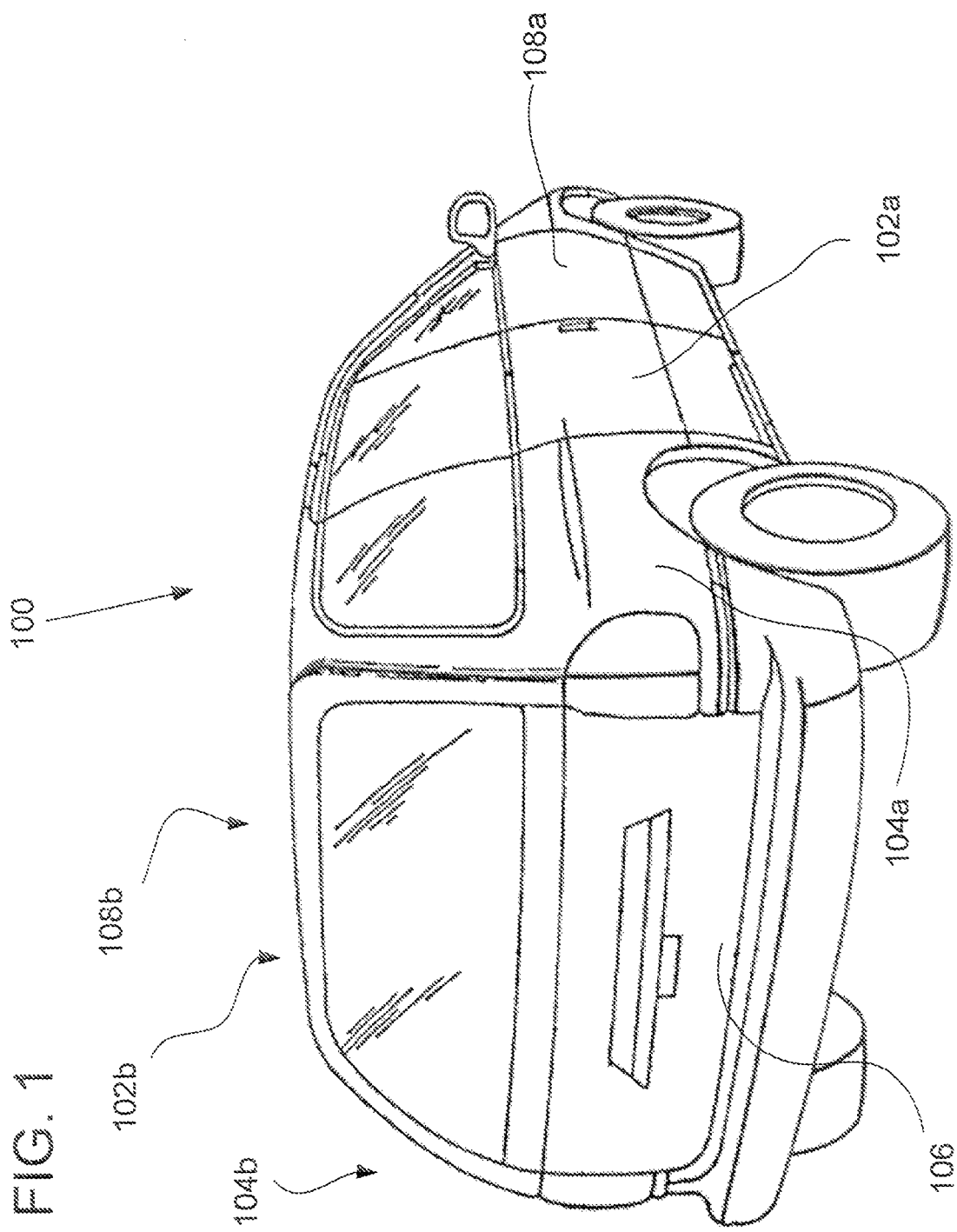
FIG. 1 is a diagram of the exterior of a vehicle from a three-quarter perspective.

FIG. 1 is an exterior view of a vehicle 100. In one example, vehicle 100 may be a minivan. The vehicle has at least one door, such as doors 102a and 102b (not visible), which are shown here in a closed position. In this example, the doors open by sliding the door toward the rear of the vehicle. It should be understood that while sliding doors are shown in this example, any manner of door may be used in their place. For example, pocket doors, outwardly swinging doors, vertically raised doors, and the like may also be used.

Figure 2:
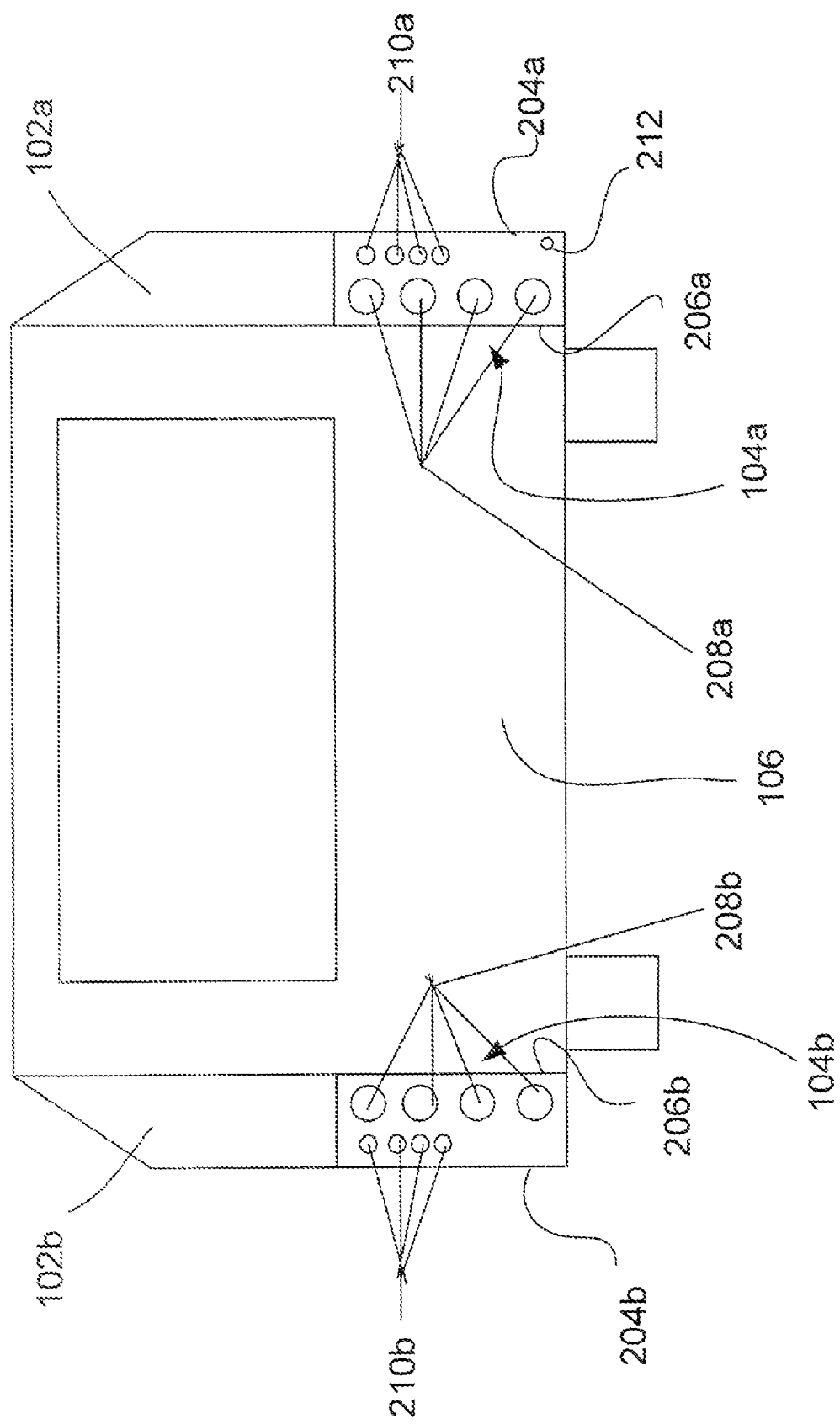
FIG. 2 is a diagram of the exterior of the rear of a vehicle with sliding doors open.

FIG. 2 is an exterior view of the rear of the vehicle. In FIG. 2, the figure is vertically symmetrical, and for simplicity, only one side of the system will be discussed. The following example should not be read to limit the system to a symmetrical system, however, as an asymmetrical system could also be implemented.

In this example doors 102a and 102b are shown in an open position. Door 102a includes an exterior side panel 204a and an interior side panel 206a. Both interior side panel 206a and exterior side panel 204a are exposed to space outside the vehicle. The side panels 204a and 206a are joined by a surface to form a rear-facing section of the door 102a.

Figure 5:
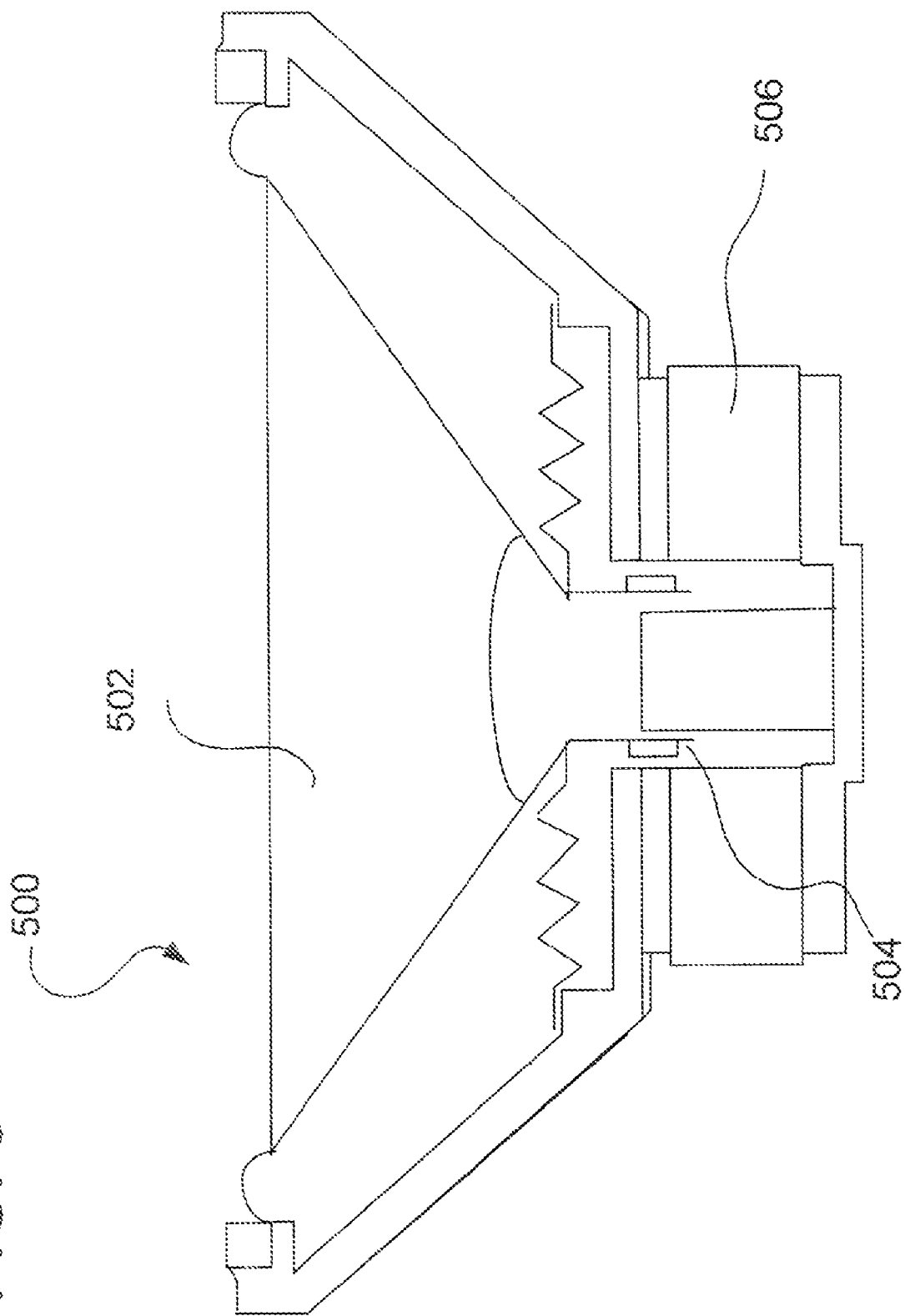
FIG. 5 is a transducer element (e.g., a speaker).

Mounted on the surface between exterior side panel 204a and interior side panel 206a are a number of speakers 208a and 210a. Although FIG. 2 shows eight speakers mounted on both doors 102a and 102b, the number and type of speakers may vary. In this example, each speaker includes a sound-projecting element such as a cone or a diaphragm 502 (FIG. 5). Sound emanates primarily from the sound-projecting elements. As shown, the speakers are mounted to let the sound-projecting elements face substantially along an axis in the longitudinal direction of the door. In this example, the longitudinal direction is from the front-to-back of the vehicle.

Although FIG. 2 shows speakers being mounted on a rear-facing section of the door 102a, the speakers could also be mounted in the surface between the exterior and interior side panels located on rear hatch 106. In this manner, when rear hatch 106 is raised, the sound-projecting elements would face rearward towards an area external to the vehicle. When hatch 106a is closed, the sound-projecting elements would face along an axis in the vertical direction of the vehicle, such as a direction from the top-to-bottom of the vehicle. Speakers 208a and 210a could also be mounted between the exterior and interior side panels located on front doors 108a and 108b in a manner similar to present example involving sliding doors.

FIG. 2 shows the speakers arranged in line arrays, where speakers 208a comprise a woofer line array, and speakers 210a comprise a tweeter line array. Different combinations of woofers, tweeters, mid range speakers, full range speakers, and the like may also be used in this system. An ideal line source radiates sound form a continuous line of infinite length. An ideal line source radiates cylindrical waves over all frequencies. A line array is a discrete, finite extent approximation to a line source. It is made up of a finite number of discrete acoustic sources arranged in a line of finite extent. Line arrays radiate a good approximation to cylindrical waves over a frequency range related to the length of the line at low frequencies, and the spacing of the discrete elements at high frequencies. Line array 208a, over a useful range of frequencies, forms a good approximation to a line source. A single transducer, by contrast, is a good approximation to a point source, which radiates waves with a spherical wave shape. Cylindrical waves decrease in amplitude as a function of distance from the source with an inverse relationship (attenuation is proportional to 1/r, where r is the distance from the source), whereas spherical waves decrease in a amplitude as a function of distance from the source with an inverse square relationship (attenuation is proportional to $1/r^2$). By using a line array configuration of speakers, sound pressure level attenuation is proportional to the distance from the speakers, and not to that distance squared. This allows the line array to propagate sound over a larger distance. This characteristic may be advantageous in certain uses of an audio system designed to provide sound to the exterior of the vehicle. However, line arrays are not required to effectively provide sound to the rear of a vehicle from loudspeakers mounted in the space between exterior and interior door panels, as described.

When the door 102a is in the open position, the speakers 208a and 210a are positioned such that their sound-projecting elements face substantially toward the rear of the vehicle. With the door in the open position, the frame 104a of the vehicle no longer blocks the sound-projecting elements of the speakers. As a result, the speakers may project sound toward the space around the exterior and towards the rear of the vehicle. For example, when the door is in the open position, the speakers will project sound from their sound-projecting elements toward a user located near the rear of the vehicle's exterior.

It is possible to provide independent program content to the vehicle interior speakers and to the speakers 208a and 210a simultaneously. A single audio source may control both the speakers 208a and 210a and any standard interior speakers located within the vehicle. In another example, however, a separate audio source may play sound through the speakers 208a and 210a while a vehicle's standard audio source continues to control the vehicle's interior sound system. Thus, speakers 208a and 210a may project sound external to the vehicle from a secondary audio source, while a first audio source causes a vehicle's internal speakers to project different sounds internal to the vehicle. More simply put, the vehicle may have two separate audio systems playing different sounds simultaneously. The audio system may also provide the same content to both speakers located within the vehicle, and to speakers 208a and 210a. This would allow users located inside and outside of the vehicle to listen to the same content.

As stated previously, the speakers 208a and 210a may play sound originating from a secondary audio source. The secondary audio source may be located either inside or outside of the vehicle, and may be connected to the vehicle's audio system in a number of ways. In one example, an input jack is positioned on the vehicle in a location that a user may access while outside the vehicle, such as an input jack 212. As shown in FIG. 2, exterior input jack 212 can be mounted between exterior side panel 204a and internal side panel 206a in a position similar to the speakers 208a and 210a. The input jack 212 does not need to be positioned on the door, and can be located anywhere on the vehicle that is accessible to a user outside the vehicle. In another example, a secondary audio source may connect to the audio system wirelessly using a number of different protocols, such as Bluetooth® protocol. Additionally, the audio source could be connected to the system through the use of component cables, electrical wires, ethernet cables, WiFi, infrared signals, or any other connection method.

Figure 3:
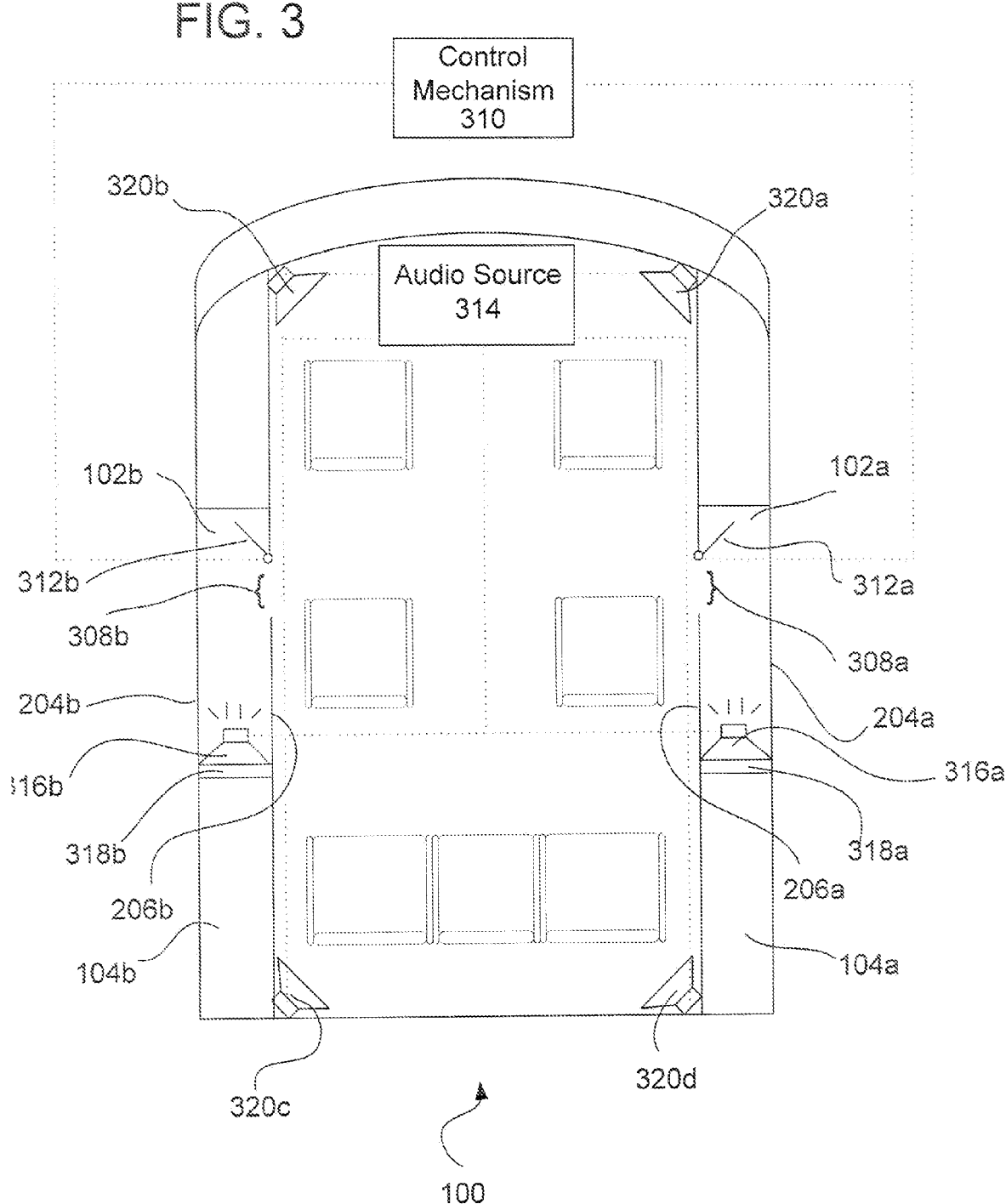
FIG. 3 is a horizontal cross section of a vehicle with sliding doors closed.

FIG. 3 is a top-down view of a cross section of the vehicle 100. In this example, the figure is vertically symmetrical, and for simplicity, only one side of the system will be discussed.

In FIG. 3, door 102a is in a closed position. Mounted in the rear-facing section 318a between the exterior and interior side panels of the door is speaker 316a. While only one speaker is shown in FIG. 3, multiple speakers may be mounted together between the interior and exterior side panels, as shown in FIG. 2. In FIG. 3, an opening 308a is disposed on interior side panel 206a to acoustically connect the space between side panels 204a and 206a to the interior cabin of the vehicle. The opening does not need to be completely unobstructed, and a material at least partially porous as to sound may span the opening, such as a grill, fabric, or mesh material.

The interior side panel 206a also includes a cover 312a that may be controlled to expose, or to extend over and close the opening. The cover may be movably connected to the interior side panel by a variety of mechanisms. For instance, the cover may swing into place on a hinge, or the cover may slide into place on a slide assembly. In the example of FIG. 3, the cover is shown as a flap mounted on a hinge assembly that is further connected to the interior side panel.

The cover may be controlled by control mechanism 310. Although shown external to the vehicle 100, the control mechanism 310 may be located inside the vehicle. The control mechanism be set to control operation of the cover according to the occurrence of a predetermined condition. For instance, the control mechanism might be configured to move the cover 312a away from opening 308a such that at least part of the opening is exposed to the interior of the vehicle in response to the door moving into the closed position. The control mechanism might work in conjunction with a contact sensor (such sensors are common on the interiors of many vehicle doors to indicate whether the door is "ajar") in order to sense whether a predetermined condition has been met (e.g., the door being in the closed position). Upon occurrence of the predetermined condition, the control mechanism could send electronic instructions to a motor that controls the movement of the cover. The control mechanism might also automatically move the cover into position using a spring assembly, lever, and/or some other electrical and/or mechanical mechanism.

When the vehicle's doors are in the closed position, speaker 316a may be controlled by audio source 314. In this example, audio source 314 controls both the interior sound system, including speakers 320a-d, and the door-mounted sound system, including speakers 316a and 316b. Audio source 314 passes an audio signal via an amplifier (not shown) to the speaker 316a. Audio source 314 may be, for example, a compact disc player, a radio, an mp3 player, or the like. The audio source is not required to be an in-dash car stereo, and does not need to be hard-wired to the vehicle's electrical system. For example, the audio source could also be an mp3 player communicating wirelessly to receiver(s) located within the vehicle. Speakers within the system may also be wired or wireless speakers.

With the door 102a in the closed position, as shown in FIG. 3, cover 312a exposes at least part of opening 308a to the interior of the vehicle. With the opening exposed, sound is allowed to pass from the interior of the door 102a through the opening 308a and into the interior of the vehicle 100. In one example, audio source 314 may control speaker 316a as well as standard interior speakers 320a-d. In this way, when the door 102a is in the closed position and audio information is passed to both the door speakers and interior speakers, the sound entering the interior of the vehicle through opening 308a may augment the sound being projected from interior speakers 320a-d. Typically, low-frequency sound, e.g., bass, will be the sound so passed from the speaker 316a through opening 308a, and into the vehicle. This may enhance the bass of interior speakers 320a-d.

In another example, the door opening 308a could be a port having an acoustic mass, where the acoustic mass is related to the cross-sectional area of the port and the length of the port. The port might be designed to resonate with the compliance of the door volume and to thus produce an acoustic filter.

The characteristics of the opening 308a may also be altered depending on whether the door is in an open or closed position. For example, a high tuning frequency may be desirable when the door is in a closed position. Because sound is radiated through the door volume and opening 308a, these elements form an acoustic low-pass filter placed between the speaker 316a and the interior of the vehicle. The corner frequency of this filter is the resonant frequency. When operating in this mode, it may be desirable for the resonance to be high in order to allow sound over a relatively wide band of frequencies to enter the interior of the vehicle from the door interior.

On the other hand, when the door is in an open position, it may be desirable for the tuning to be lower and for the sound from the port to augment the low frequency performance of driver 316a, and one might adjust the port cross section area, the port length, or both to alter the tuning. In one instance, a mechanical tubular structure could increase or decrease its length in some way in response to the door opening or closing. When the door opens, it may be desirable for the length to increase (to lower tuning), and when the door closes, it may be desirable for the length to decrease (to raise tuning). Alternatively, when the door opens, it may be desirable for the port cross sectional area to decrease (to lower tuning), and when the door closes for the port cross sectional area to increase (to raise tuning).

Figure 4:
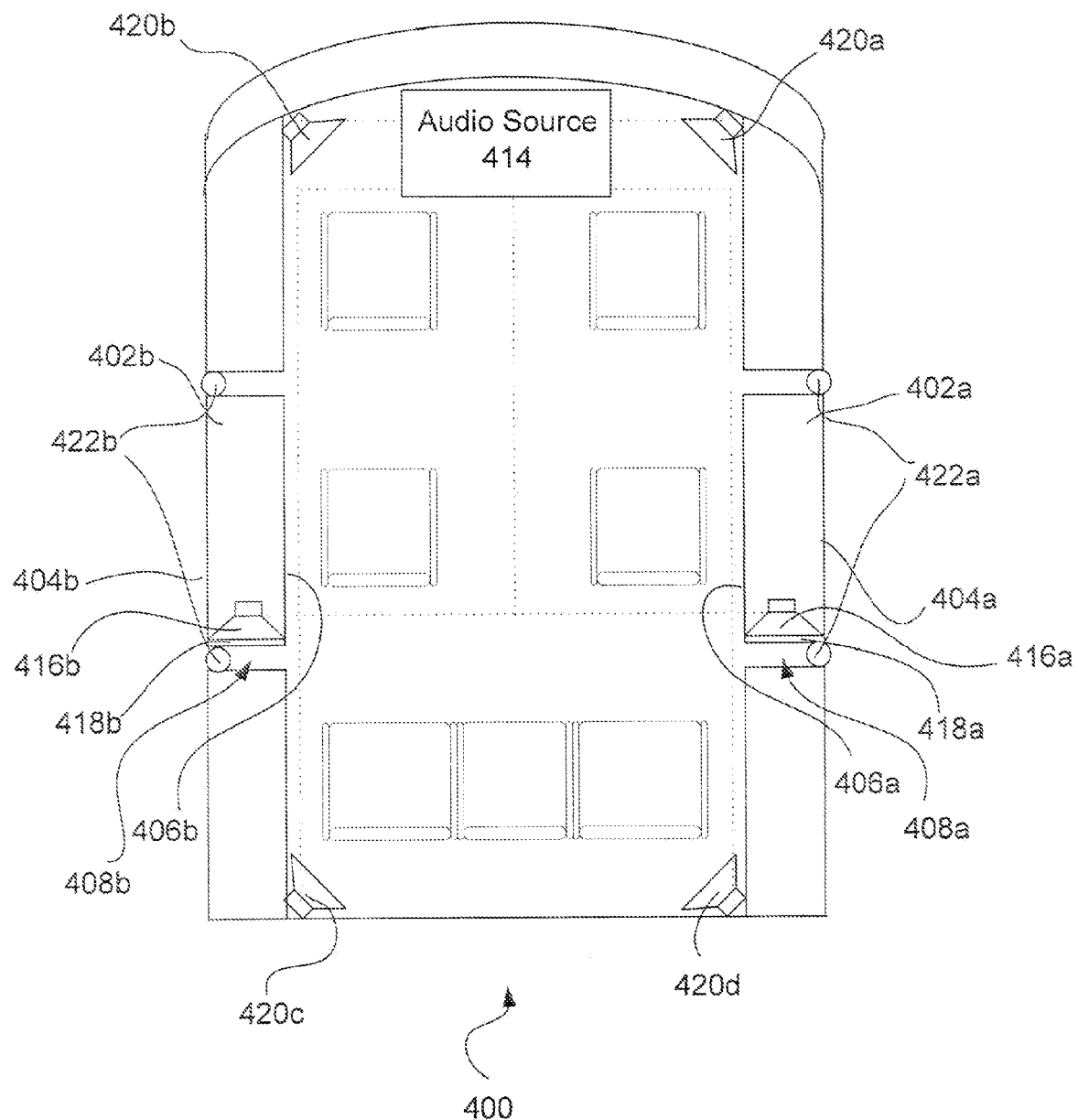
FIG. 4 is a second horizontal cross section of a vehicle with sliding doors closed.

FIG. 4 shows another example of the interior/exterior audio system described herein. Here, vehicle 400 is again a minivan, and its top-down cross section is shown. In this example, the figure is vertically symmetrical, and for simplicity, only one side of the system will be discussed. The following example should not be read to limit the system to a symmetrical system, however, as an asymmetrical system could be implemented.

FIG. 4 shows the doors 402a and 402b in a closed position. The speaker 416a is again mounted in the rear-facing surface between exterior side panel 404a and interior side panel 406a in the same fashion as described above. When the door 402a is in the closed position, sound is projected from the front of speaker 416a toward gap 408a. Here, the gap is not a hole, but rather a lack of weather seal.

In the usual case, a vehicle may have two weather proof seals. For example, an exterior seal is attached to an exterior side panel of a vehicle's door along the outside perimeter, such that the seal would be positioned between speaker 416a and an area external to the vehicle. An interior seal would be mounted to the door frame such that the door contacts the seal when it is in a closed position such that the seal would be positioned between speaker 416a and an area internal to the vehicle. The door frame (not shown) is a surface where the interior side panel 406 would contact the main body of the vehicle when the door is closed.

In this embodiment, however, there is no interior weather seal on the door frame, and its absence results in a gap between the door and the door frame. Accordingly, when the door is closed, sound may enter the interior of the vehicle 400 through the gap 408a between the door and the door frame. The gap results from the lack of a seal between interior side panel 406a and the door frame. In this manner, sound produced by speaker 416a may enter the interior of the vehicle and augment the sound being produced by the vehicle's standard interior speakers 420a-d.

As stated above, the gap 408a may result from an absence of a seal along the door frame. Weather seals 422a are located along the exterior of the door 402a between speaker 416a and an area external to the vehicle. By failing to position a weather seal along the door frame, a passageway (e.g., gap 408a) between the interior cabin of the vehicle and the surface 418a can be created. The lack of a seal along the door frame thus allows sound from speaker 416a (especially low-frequency sound) to enter the interior of the vehicle. In order to preserve the weatherproof nature of door 402a, the seal 422a disposed along exterior side panel 404a may be bolstered or fortified to compensate for the lack of a seal along interior side panel 406a. The seal may be comprised of an elastomer, or any other weatherproof material.

FIG. 5 shows a section through a speaker 500 and some of its various parts. Although speaker 500 represents one possible type of speaker that could be used in the audio system described previously, other types of speakers may also be used. When a current is passed through a coil of wire 504, referred to as a voice coil, it generates a magnetic field. The resulting field interacts with the field of the magnet 506, which causes the voice coil to move along an axis parallel to the axis of symmetry of the speaker. A transducer element has a moving surface for projecting sound, such as sound-projecting element 502 (commonly called "a cone" or "a diaphragm"). The sound-projecting element has two sides and, as it moves forward, the pressure in front of the sound-projecting element increases while the pressure behind the sound-projecting element decreases. When the sound-projecting element moves back, the opposite occurs. Thus, the sound pressure radiated by the front side and the rear side of the sound-projecting element has reversed polarity; that is they are 180 degrees out of phase across frequency.

The direction of movement depends on the direction of current flow through the voice coil. Because audio is an AC waveform, current flows in one direction and then changes polarity. In response, the voice coil moves either forward or backward from its point of rest. The sound-projecting element is the part of the speaker that actually makes the sound by alternately creating an area of high and then low air pressure.

If a speaker is not contained within an enclosure, when the pressure in front of the sound-projecting element rises due to forward motion (and the pressure near the rear of the sound-projecting element decreases), the opposite polarity waves radiated from the front and back of the sound-projecting element will largely cancel each other out. This results from the sound-projecting element moving air back and forth around the speaker, instead of radiating sound waves away from the speaker. For this reason, among others, it is desirable for transducers to be placed into an enclosure, e.g., door 102a (FIGS. 1-4).

The enclosure separates the front waves from the rear waves so that sound may radiate into a listening space, rather than effectively canceling each other. When an opening to the interior of the vehicle is created in the interior side panel as in FIG. 3, the rear wave may radiate into the vehicle's interior. Accordingly, when the door is in a closed position, the primary sound entering the vehicle's interior from speaker 316a or 416a will come from this rear wave. The door seal separates the front radiation from the interior listening environment.

If there is an opening in the interior side panel of the door, when the door is in the open position, sound from both the front and rear of the speaker will radiate into the listening environment. This can result in cancellation of some sound that would otherwise be radiated. For this reason, it is desirable to close off the door panel opening when the door is in an open position (e.g., using the system of FIG. 3). If the opening can be closed, sound to the listening area in the rear of the van primarily comes from the front of the speaker, and cancellation can be reduced significantly by containing sound from the rear of the speaker within the door. However, the speaker is now loaded by the door, and the door has a volume and therefore acts like a spring. Accordingly, the transducers may be designed to work effectively with this spring to achieve desired characteristics.

In the alternative arrangement of FIG. 4, there is no opening in the interior door panel. The lack of a weather seal on the inside surface of the door between door and frame allows sound from the front of the speaker to reach the interior of the vehicle when the door is closed by passing through the gap between the door and door frame.

A number of embodiments have been described. Nevertheless, it will be understood that various modifications may be made without departing from the spirit and scope of the claims. For example, one speaker in each embodiment may be capable of delivering frequencies of different ranges. Furthermore, the audio system described above may be equipped with any of a variety of common peripheral items and may be operated by remote control. Also, the number of speakers shown in any figures should not be understood to represent only one speaker; rather, speaker 416a, for instance, may represent any number of speakers that can be made to fit within the door 402a. Accordingly, other embodiments are within the scope of the following claims.

Elements of different embodiments may be combined to form embodiments not specifically described herein.

What is claimed is:

1. An audio system for a vehicle, comprising:
   one or more speakers mounted in a surface between an exterior side panel and an interior side panel of a door on the vehicle, wherein
   the interior side panel includes an opening to acoustically connect the one or more speakers to an interior of the vehicle;
   the interior side panel comprises a cover that is controllable to expose, or to extend over and close the opening;
   when the door is open, the cover is controlled to extend over and close the opening, thereby preventing sound from the one or more speakers to exit the interior panel of the door; and
   when the door is closed, the cover is controlled to expose the opening, thereby allowing sound from the one or more speakers to enter an interior of the vehicle through the opening.

2. The system of claim 1, wherein the one or more speakers comprise sound-projecting elements that are mounted to face substantially along an axis in the longitudinal direction of the door.

3. The system of claim 1, further comprising:
a control mechanism to control the cover, the control mechanism comprising an electro-mechanical or a mechanical system configured to operate in response to opening or closing the door.

4. The system of claim 1, further comprising:
an input module for receiving data from an audio source, the input module being mounted on an exterior of the vehicle or being mounted to the surface in which the one or more speakers are mounted.

5. The system of claim 1, wherein:
each of the one or more speakers comprises a cone having a front part and a back part; and
the opening acoustically connects the back part of the one or more speakers to enable sound to enter an interior of the vehicle via the opening, wherein the sounds that enters the interior of the vehicle augments sound being produced for the interior of the vehicle by other speakers in the vehicle.

6. The system of claim 1, where the speakers form a line array.

7. An audio system for a vehicle, comprising:
a door assembly, the assembly comprising a door, a door frame, one or more speakers, an exterior side panel, an interior side panel, and a seal;
wherein the one or more speakers are mounted in a surface joining the exterior side panel to the interior side panel such that the speakers face from an edge of the door into the door frame when the door is closed;
wherein the seal is mounted to the perimeter of the door such that it is located between the one or more speakers and an exterior of the vehicle;
wherein the one or more speakers comprise sound-projecting elements that direct sound to an exterior of the vehicle when the door is open;
wherein, when the door is closed, sound from the one or more speakers enters an interior of the vehicle through a gap between the door and the door frame resulting from an absence of the seal along the door frame.

8. The system of claim 7, wherein sound enters an interior of the vehicle to augment sound being produced for the interior of the vehicle by other speakers in the vehicle.

9. The system of claim 7, wherein the one or more speakers are mounted in the door such that the sound-projecting elements of the one or more speakers face substantially along an axis in the longitudinal direction of the door.

10. The system of claim 7, wherein the seal comprises an elastomer.

11. The system of claim 7, wherein the speakers form a line array; and
wherein the speakers in the line array face substantially toward a rear of the vehicle.

12. The system of claim 7, further comprising:
an input module for receiving data from an audio source, the input module being mounted on an exterior of the vehicle or being mounted to the surface in which the one or more speakers are mounted.

* * * * *